Dec. 1, 1931.  L. O. GRANGE  1,834,899
TIRE RETREAD VULCANIZER
Filed Sept. 26, 1931  4 Sheets-Sheet 1
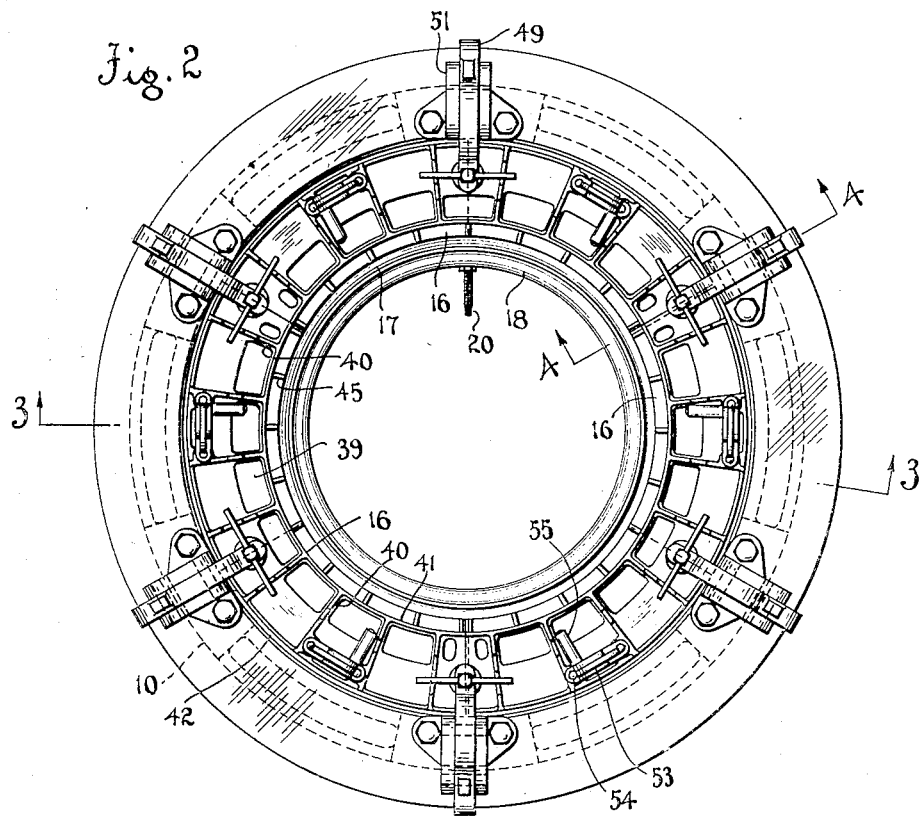
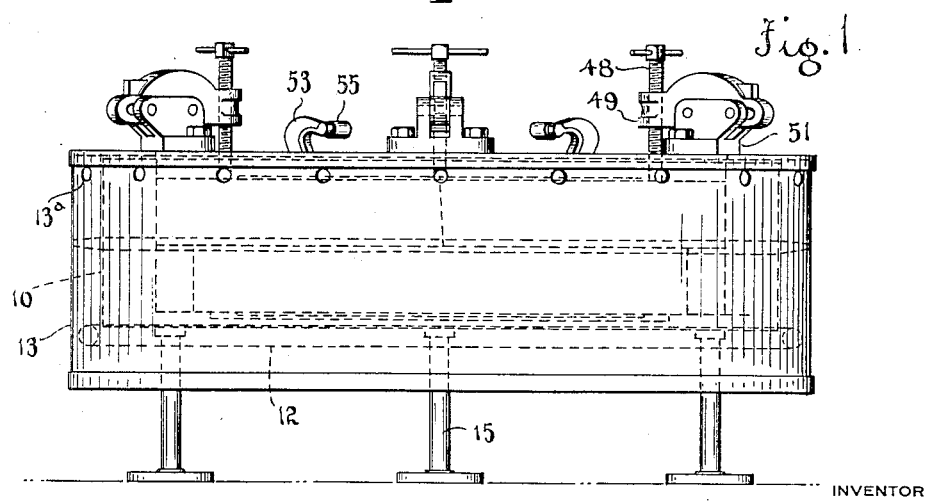
INVENTOR
Leo O. Grange
BY
Ely & Barrow
ATTORNEYS Dec. 1, 1931.  L. O. GRANGE  1,834,899
TIRE RETREAD VULCANIZER
Filed Sept. 26, 1931  4 Sheets-Sheet 2
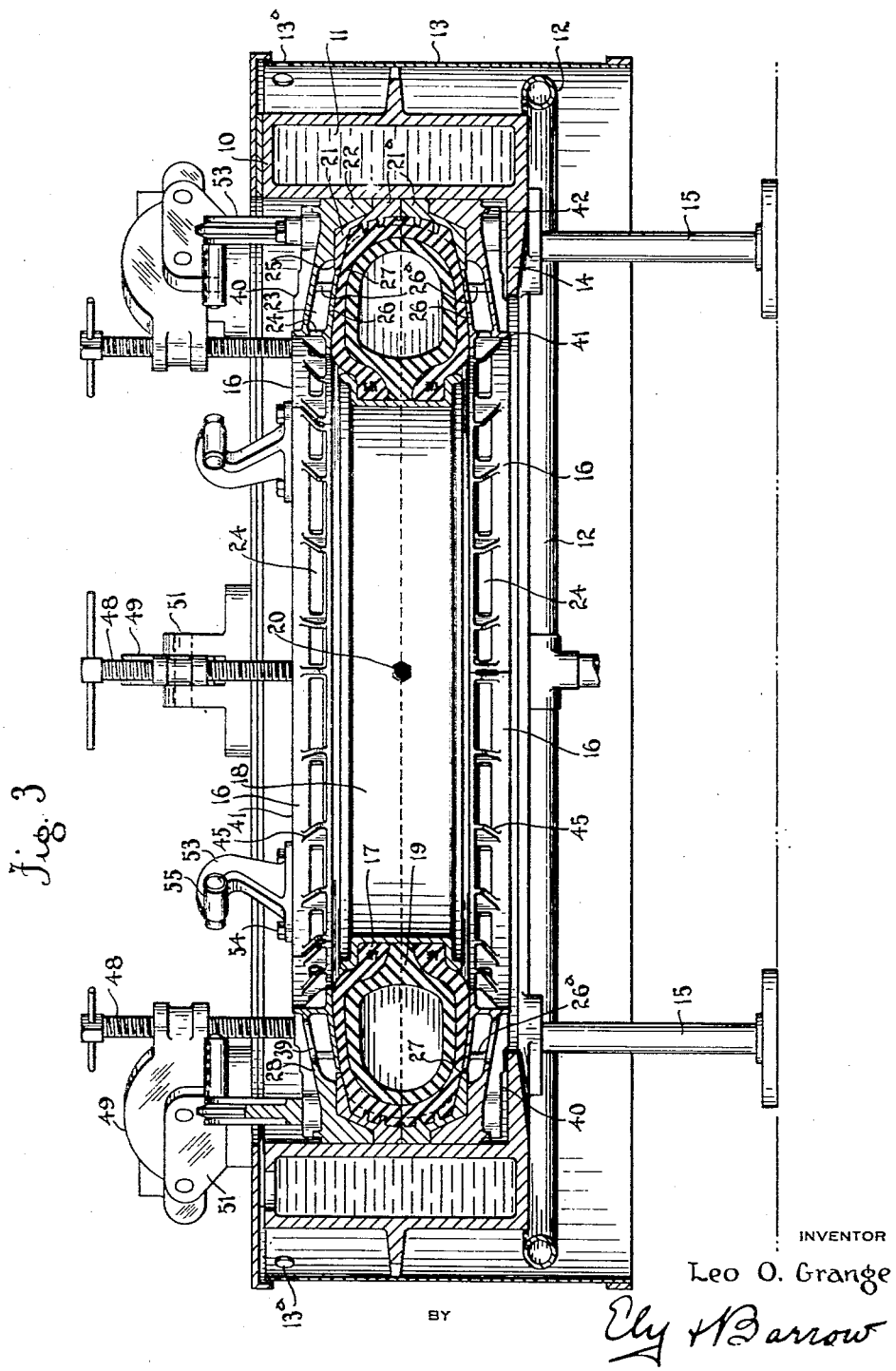
INVENTOR
Leo O. Grange
BY Ely H Barrow
ATTORNEYS Dec. 1, 1931. L. O. GRANGE 1,834,899
TIRE RETREAD VULCANIZER
Filed Sept. 26, 1931 4 Sheets-Sheet 3
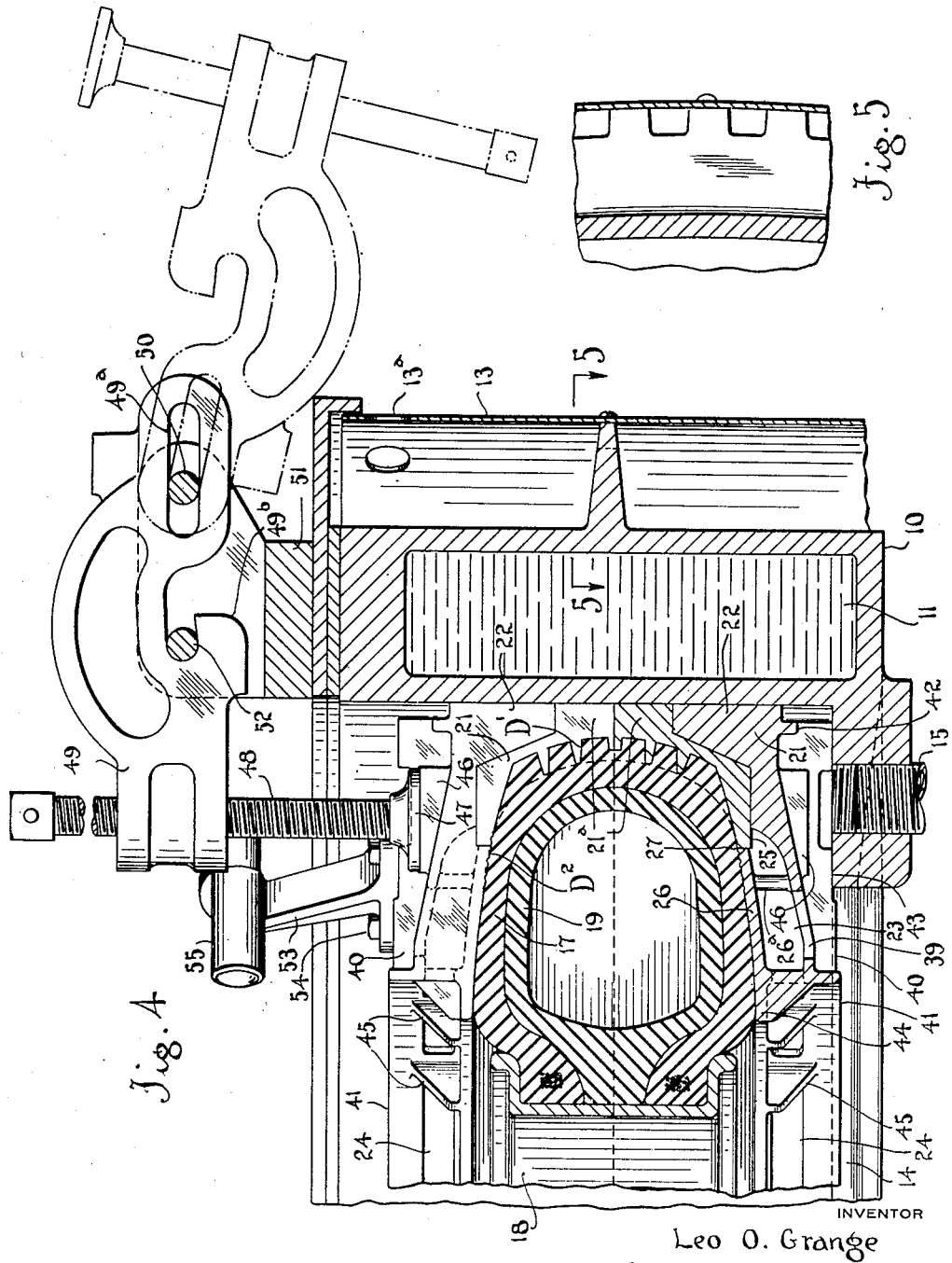
INVENTOR
Leo O. Grange
BY
Ely & Barrow
ATTORNEYS

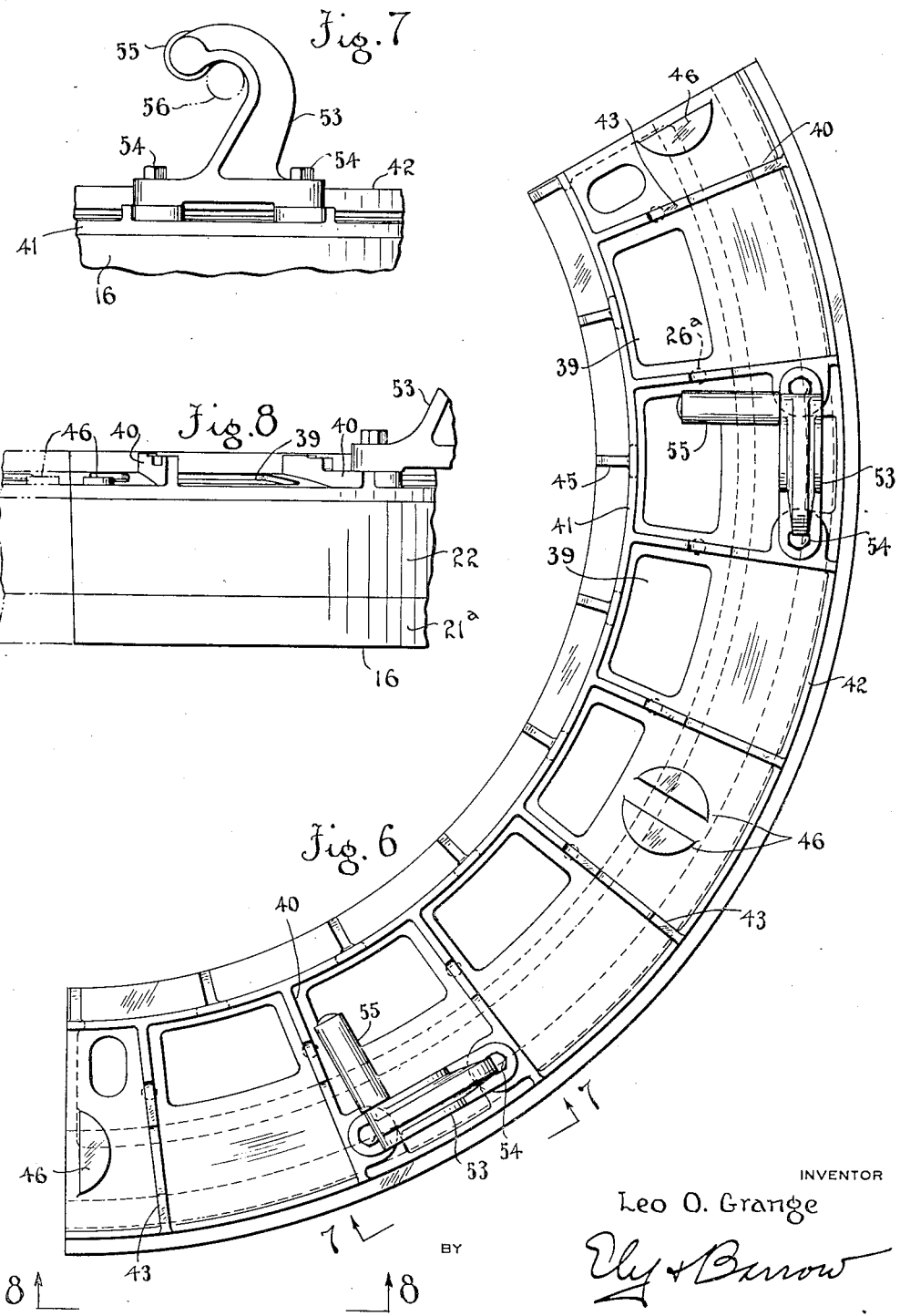

Patented Dec. 1, 1931

1,834,899

UNITED STATES PATENT OFFICE

LEO O. GRANGE, OF CHICAGO, ILLINOIS

TIRE RETREAD VULCANIZER

Application filed September 26, 1931. Serial No. 565,254.

This invention relates to retreaders for vulcanizing new threads upon worn pneumatic tire casings, and particularly to retreaders of that type referred to in the art as "full circle."

Heretofore, a number of different types of full circle retreaders have been proposed and a few have been used to some extent, but these have not been entirely satisfactory, neither from the standpoint of operation and maintenance, nor from the standpoint of quality of the work.

Full circle retread vulcanizers require the use of removable and replaceable matrices. In the past matrices of these types have had associated therewith various cooperating parts requiring to be assembled and disassembled each time a tire tread is cured. These various parts frequently are misaligned when assembled and result in imperfect work. One purpose of the present invention is to provide a matrix construction which can be easily and quickly assembled with or disassembled from the retreader and which when assembled will be in perfect alignment. A further object in connection with this is to provide simple, easily operated clamps so associated with the vulcanizer that they may be swung clear of the matrix and tire so as not to interfere with removal of the work from the retreader.

Full circle retreaders as heretofore constructed have not been successful in accomplishing effective jointure of the new tread at its edges and without the presence of marks and spongy portions in the rubber at the edges of the tread. This, applicant has discovered, has been due to attempts in prior forms of retreaders to abruptly terminate the application of heat at the edges of the tread to avoid marks further inwardly on the side walls of the tire. Applicant has found that a secure union at the edges of the tread may be secured with solid, non-spongy, unmarked rubber by "tapering" the heat gradually from adjacent the edges of the tread to the inner skirts of the matrix, the tapering of the heat being obtained by a particular construction of the matrix whereby at the extreme edges of the skirts of the matrix it is sufficiently cold to avoid marking of the tire. By this construction also heat losses are reduced and savings in fuel thereby effected.

The foregoing and other purposes of the invention are attained by the vulcanizer illustrated in the accompanying drawings and described below. It is to be understood that the invention is not limited to the specific form thereof shown and described.

Of the accompanying drawings,

Figure 1 is an elevation of a full circle retreader embodying the invention and having a tire being vulcanized therein;

Figure 2 is a plan view thereof;

Figure 3 is an enlarged section on line 3—3 of Figure 2;

Figure 4 is an enlarged section on line 4—4 of Figure 2;

Figure 5 is a section on line 5—5 of Figure 4;

Figure 6 is a plan view of a matrix section embodying the invention;

Figure 7 is an elevation of that portion of the matrix marked off by line 7—7 on Figure 6; and Figure 8 is an elevation of that portion of the matrix marked off by line 8—8 on Figure 6.

Referring to the drawings, the numeral 10 designates an outer annular heating member which may be provided with a chamber 11 containing a fluid heating medium heated by a burner 12 arranged about the lower edge of member 10 in a casing 13 open at its bottom and having outlets $13^a$, $13^a$ at its top for exit of gases of combustion. The lower end of member 10 is provided with an inner flange 14 to receive and support the matrix and the member 10 may be supported by legs 15, 15.

The matrix preferably comprises lower and upper arcuate sections 16, 16 (three each being shown) which may be of similar construction and are shaped and cooperate to embrace the periphery or tread and side walls of a pneumatic tire 17 supported on a rim 18 such as the standard tire rim and containing a pressure bag 19 having an inflating valve 20. The body portions of these sections are preferably made of suitable metal such as malleable iron having a comparatively low conductivity and comparatively low factor of radiation and these sections preferably have removable and replaceable non-skid segments 21 of suitable metal such as aluminum having comparatively high factors of conductivity and radiation. The body portions of the matrix embrace the non-skid segments as at 22 and are in direct contact with the inner wall of the heated annulus 10 whereby a portion of the heat is conducted thereby to the non-skid segments and to the skirts of the matrix. The non-skid elements 21 have portions 21$^a$ at the center of the tread in direct contact with member 10. It will thus be apparent that the heat is concentrated somewhat at the center or thickest part of the tread and that it begins to taper therefrom toward the inner edges of the skirts of the matrix by reason of the lower conductivity of the malleable iron. It is also apparent that the upper and lower exposed surfaces of the matrix being malleable iron, the heat losses by radiation are substantially reduced over constructions employing matrices wholly of aluminum.

As a further means of tapering the heat toward the skirts of the matrix, these are cored out as at 23 with openings 24, 24 extending herein to permit circulation of air in the cored out portions. To facilitate manufacture and also to provide a construction which will further permit a controlled tapering of heat toward the skirts of the matrix the cored out portions 23 have an opening at 25 into the portion of the matrices which receives the non-skid elements 21. The inner edges of the non-skid elements 21 and the outer edges of the inner walls 26 of the body portions of the matrices contact at 27 and the area of this contact is so proportioned as to convey the requisite heat to the sides of the matrix to thoroughly vulcanize the thinner edge portions of the tread at the sides of the tire under pressure so that no mold marks or sponginess of the vulcanized rubber will occur at these points.

The inner walls 26 of the matrix are strengthened by posts of metal 26$^a$ formed in the cored out portions 23 and to further permit circulation of air about the inner wall 26 and radiation therefrom to taper the heat as described, the outer walls 28 of the body portion of the matrix are apertured as at 39, 39. The matrix is further strengthened by ribs 40, 40 extending radially thereof between the apertures 39 toward the inner edges of the matrix and by inner and outer circumferential ribs 41 and 42. Certain of ribs 40 are machined as at 43 so that the lower matrix may rest on these on the flange 14 (see Figure 4). The inner portions of the skirts of the matrices at 44 are strengthened by ribs 45, 45 between apertures 24, these ribs and apertures being staggered respecting the ribs 40 and apertures 24, whereby the heat conveyed to the extreme inner edges of the matrices will be reduced to a minimum to the end that the side walls of the tire will not be marked by these edges.

The matrix sections are each formed with bosses 46, 46 (see Figure 4) against which clamp screw bases 47, 47 may be urged on the upper sections in the vulcanizer to hold the matrix sections in assembly during cure. The clamp screw bases 47 may be secured upon clamp pressure screws 48, 48 adjustable through clamp bodies 49, 49 slidably and pivotally mounted upon pins 50, 50 on clamp brackets 51, 51 arranged about the top of the vulcanizer casing whereby when not in use the clamps may be swung outwardly from over the matrix to the dotted line position (Figure 4) to permit placement and easy removal of the tire and matrix. Pins 50 engage in slots 49$^a$, 49$^a$ in clamp bodies 49 and the latter are provided with hooks 49$^b$, 49$^b$ on the under sides thereof to engage under pins 52, 52 to hold the clamp bodies 49 in a clamping position (full line position in Figure 4).

To facilitate removal of the upper matrix sections from the vulcanizer, hook-like lug members 53, 53 may be removably secured thereto as by screw bolts 54, 54 threaded into apertures in the matrix sections. These members may be provided with handles 55, 55 and are adapted to receive thereunder a bar 56 (shown in dotted lines in Figure 7) to apply a lifting force to the upper matrix sections. As a further means of facilitating removal of the matrix sections one or more of these may be slightly tapered (see Figure 8) to provide sufficient draft that it will not bind on adjoining sections even though it is tipped to some extent upon withdrawal. This permits tighter fitting of the matrix sections to avoid forming a fin or mark on the tire at the joints between the matrix sections as occurs when sufficient clearance is provided to permit removal of the matrix parts.

It will be understood that the matrix may be formed to produce any desired design as at D' in the tread of the tire any desired number of ribs or corrugations as at D$^2$ where the tread adjoins the side walls of the tire. At D$^2$ the temperature in the tread segments and in the body portion of the matrix is such as to secure thorough vulcanization at the edges of the tread with the rubber so confined under pressure during vulcanization that there will be no sponginess or marks other than those formed by the design cut into the matrix.

In use, the lower matrix sections are assembled in the vulcanizer on the flange 14. The tire to be vulcanized is mounted on its rim with a pressure bag inclosed therein and placed on the lower matrix sections. The upper matrix sections are next placed in the vulcanizer on the tire. The clamps are then swung inwardly and locked, the clamp screws being adjusted to urge the upper and lower sections into cooperation. Air under pressure is supplied the pressure bag. The vulcanizer member 10 is maintained at a vulcanizing temperature and heat is transferred directly therefrom to the central portion of the tread segments and to the outer peripheral portions of the body of the matrix. This heat is conveyed by the body of the matrix to the side portions of the tread segments and from these a portion of the heat is conveyed to the inner walls 26 of the cored out skirts of the matrix, which inner walls are further heated somewhat indirectly by passage of heat inwardly through the outer walls of the skirts of the matrix to the inner edges of the skirts. Due to the arrangement of apertures 24 and 39, the heat arriving finally at the inner edges of the matrix skirts is insufficient to cause marking of the tire, the heat tapering gradually from that required to vulcanize the thick portion of the new tread on the tire, to the somewhat reduced temperature required at the edges of the tread as at $D^2$ and from this point tapering off to a non-vulcanizing temperature at the extreme inner edges of the matrix.

After the vulcanization of the new tread on the tire has proceeded for the required time, the pressure bag is deflated, the clamps disengaged and swung outwardly out of the way, and the tire is removed from the apparatus.

Modifications of the invention may be resorted to without departing from the spirit thereof or the scope of the appended claims.

What is claimed is:—

1. A tire retreader comprising an annular heated member, means for supporting a matrix therein, a sectional matrix adapted to be placed in said heated member, said matrix including a body portion of material having comparatively low factors of heat conductivity and heat radiation and a tread-molding insert of material having comparatively high factors of heat conductivity and radiation, said tread molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, radial strengthening ribs on the outside of the matrix extending between said first-named openings, additional strengthening ribs on the outside of the matrix extending between said second-named openings to the inwardly extended portion of the inner wall of the matrix skirts, and inner and outer circumferential strengthening ribs on the outside of the matrix between which the first-named radial ribs extend, the second-named radial ribs extending inwardly of the inner circumferential rib, and means for clamping said matrix against said supporting means comprising a series of clamps arranged on the heated member and movable between clamping positions in the central opening of the heated member and released positions outwardly of said central opening, said matrix being adapted to embrace the tread and side walls but not the bead portions of a tire mounted on a rim and containing a pressure bag adapted to be inflated to maintain pressure of the tire against the inside of the matrix during vulcanization.

2. A tire retreader comprising an annular heated member, means for supporting a matrix therein, a sectional matrix adapted to be placed in said heated member, said matrix including a body portion and a tread-molding insert, said tread-molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, radial strengthening ribs on the outside of the matrix extending between said first-named openings, additional strengthening ribs on the outside of the matrix extending between said second-named openings to the inwardly extended portion of the inner wall of the matrix skirts, and inner and outer circumferential strengthening ribs on the outside of the matrix between which the first-named radial ribs extend, the second-named radial ribs extending inwardly of the inner circumferential rib, and means for clamping said matrix against said supporting means comprising a series of clamps arranged on the heated member and movable between clamping positions in the central opening of the heated member and released positions outwardly of said central opening, said matrix being adapted to embrace the tread and side walls but not the bead portions of a tire mounted on a rim and containing a pressure bag adapted to be inflated to maintain pressure of the tire against the inside of the matrix during vulcanization.

3. A tire retreader comprising an annular heated member, means for supporting a matrix therein, a sectional matrix adapted to be placed in said heated member, said matrix including a body portion of material having comparatively low factors of heat conductivity and heat radiation and a tread-molding insert of material having comparatively high factors of heat conductivity and radiation, said tread molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, and means for clamping said matrix against said supporting means comprising a series of clamps arranged on the heated member and movable between clamping positions in the central opening of the heated member and released positions outwardly of said central opening, said matrix being adapted to embrace the tread and side walls but not the bead portions of a tire mounted on a rim and containing a pressure bag adapted to be inflated to maintain pressure of the tire against the inside of the matrix during vulcanization.

4. A tire retreader comprising an annular heated member, means for supporting a matrix therein, a sectional matrix adapted to be placed in said heater member, said matrix including a body portion of material having comparatively low factors of heat conductivity and heat radiation and a tread-molding insert of material having comparatively high factors of heat conductivity and radiation, said tread molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, radial strengthening ribs on the outside of the matrix extending between said first-named openings, additional strengthening ribs on the outside of the matrix extending between said second-named openings to the inwardly extended portion of the inner wall of the matrix skirts, and inner and outer circumferential strengthening ribs on the outside of the matrix between which the first-named radial ribs extend, the second-named radial ribs extending inwardly of the inner circumferential rib, and means for clamping said matrix against said supporting means, said matrix being adapted to embrace the tread and side walls but not the bead portions of a tire mounted on a rim and containing a pressure bag adapted to be inflated to maintain pressure of the tire against the inside of the matrix during vulcanization.

5. A tire retreader comprising an annular heated member, means for supporting a matrix therein, a sectional matrix adapted to be placed in said heated member, said matrix including a body portion and a tread-molding insert, said tread-molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, and means for clamping said matrix against said supporting means comprising a series of clamps arranged on the heated member and movable between clamping positions in the central opening of the heated member and released positions outwardly of said central opening, said matrix being adapted to embrace the tread and side walls but not the bead portions of a tire mounted on a rim and containing a pressure bag adapted to be inflated to maintain pressure of the tire against the inside of the matrix during vulcanization.

6. A tire retreader comprising an annular heated member, means for supporting a matrix therein, a sectional matrix adapted to be placed in said heated member, said matrix including a body portion and a tread-molding insert, said tread molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, radial strengthening ribs on the outside of the matrix extending between said first-named openings, additional strengthening ribs on the outside of the matrix extending between said second-named openings to the inwardly extended portion of the inner wall of the matrix skirts, and inner and outer circumferential strengthening ribs on the outside of the matrix between which the first-named radial ribs extend, the second-named radial ribs extending inwardly of the inner circumferential rib, and means for clamping said matrix against said supporting means, said matrix being adapted to embrace the tread and side walls but not the bead portions of a tire mounted on a rim and containing a pressure bag adapted to be inflated to maintain pressure of the tire against the inside of the matrix during vulcanization.

7. A tire retreader comprising an annular heated member, means for supporting a matrix therein, a sectional matrix adapted to be placed in said heated member, said matrix including a body portion of material having comparatively low factors of heat conductivity and heat radiation and a tread-molding insert of material having comparatively high factors of heat conductivity and radiation, said tread molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanize the side edge portions of the tread thoroughly to the adjoining side walls of the tire, the inner portions of the outer walls of the skirts being provided with openings and the inner edge walls of the skirts also being provided with openings staggered respecting said first-named openings, said inner wall of the skirt portions being extended radially inwardly of said outer walls and said inner edge walls, and means for clamping said matrix against said supporting means, said matrix being adapted to embrace the tread and side walls but not the bead portions of a tire mounted on a rim and containing a pressure bag adapted to be inflated to maintain pressure of the tire against the inside of the matrix during vulcanization.

8. A tire retreader comprising an annular heated member, means for supporting a matrix therein, a sectional matrix adapted to be placed in said heated member, said matrix including a body portion and a tread-molding insert, said tread-molding insert having a central peripheral portion adapted directly to contact said heated member, said body portion embracing side portions of the tread-molding insert and its peripheral portions also contacting directly with said heated member, the inner or skirt portions of said body portion being hollow and providing inner and outer walls, the outer edge of the inner wall being spaced from the outer wall and the tread-molding insert being in contact therewith, the area of the said outer edge of said inner wall being proportioned such that a vulcanizing heat will be conveyed to the outer portion of the inner wall to vulcanizing the side edge portions of the tread thoroughly to the adjoining side walls of the tire, the inner portions of the outer walls of the skirts being provided with openings and the inner edge walls of the skirts being also provided with openings staggered respecting said first-named openings, said inner wall of the skirt portions being extended radially inwardly of said outer walls and said inner edge walls, and means for clamping said matrix against said supporting means, said matrix being adapted to embrace the tread and side walls but not the bead portions of a tire mounted on a rim and containing a pressure bag adapted to be inflated to maintain pressure of the tire against the inside of the matrix during vulcanization.

9. A retread vulcanizer comprising an annular heating member and a matrix for fitting in the central opening thereof, said matrix comprising a body portion of material of comparatively low heat conductivity and a tread-molding insert of material of comparatively high heat conductivity, the central peripheral portion of the insert directly engaging the heating member and the body portion embracing the side portions of said insert, the periphery of said body portion also being in contact with said heated member, the skirt portions of said matrix inwardly of said insert being hollow and providing an inner wall spaced from the outer wall thereof at its outer edge, said insert being in contact with said outer edge of the inner wall, the area of which outer edge is so proportioned as to deliver vulcanizing heat to the said inner wall of the skirt for application to the tire adjacent the inner edge of the tread portion and the outer portions of the side walls of the tire, the inner portion of the outer walls of the matrix skirts being apertured to dissipate heat from the inner portions of the inner walls of the skirt and the inner walls of the skirt being extended inwardly of the outer walls whereby the heat is tapered to less than a vulcanizing temperature at the inner edges of the inner walls of the skirt, and means for clamping said matrix about a tire in said annular heating member.

10. A retread vulcanizer comprising an annular heating member and a matrix for fitting in the central opening thereof, said matrix comprising a body portion of material of comparatively low heat conductivity and a tread-molding insert of material of comparatively high heat conductivity, the central peripheral portion of the insert directly engaging the heating member and the body portion embracing the side portions of said insert, the periphery of said body portion also being in contact with said heated member, the skirt portions of said matrix inwardly of said insert being hollow and providing an inner wall spaced from the outer wall thereof at its outer edge, said insert being in contact with said outer edge of the inner wall, the area of which outer edge is so proportioned as to deliver vulcanizing heat to the said inner wall of the skirt for application to the tire adjacent the inner edge of the tread portion and the outer portions of the side walls of the tire, the inner portion of the outer walls of the matrix skirts being apertured to dissipate heat from the inner portions of the inner walls of the skirt whereby the heat is tapered to less than a vulcanizing temperature at the inner edges of the inner walls of the skirt, and means for clamping said matrix about a tire in said annular heating member.

11. A retread vulcanizer comprising an annular heating member and a matrix for fitting in the central opening thereof, said matrix comprising a body portion and a tread-molding insert, the central peripheral portion of the insert directly engaging the heating member and the body portion embracing the side portions of said insert, the periphery of said body portion also being in contact with said heated member, the skirt portions of said matrix inwardly of said insert being hollow and providing an inner wall spaced from the outer wall thereof at its outer edge, said insert being in contact with said outer edge of the inner wall, the area of which outer edge is so proportioned as to deliver vulcanizing heat to the said inner wall of the skirt for application to the tire adjacent the inner edge of the tread portion and the outer portions of the side walls of the tire, the inner portion of the outer walls of the matrix skirts being apertured to dissipate heat from the inner portions of the inner walls of the skirt and the inner walls of the skirt being extended inwardly of the outer walls whereby the heat is tapered to less than a vulcanizing temperature at the inner edges of the inner walls of the skirt, and means for clamping said matrix about a tire in said annular heating member.

12. A retread vulcanizer comprising an annular heating member and a matrix for fitting in the central opening thereof, said matrix comprising a body portion and a tread-molding insert, the central peripheral portion of the insert directly engaging the heating member and the body portion embracing the side portions of said insert, the periphery of said body portion also being in contact with said heated member, the skirt portions of said matrix inwardly of said insert being hollow and providing an inner wall spaced from the outer wall thereof at its outer edge, said insert being in contact with said outer edge of the inner wall, the area of which outer edge is so proportioned as to deliver vulcanizing heat to the said inner wall of the skirt for application to the tire adjacent the inner edge of the tread portion and the outer portions of the side walls of the tire, the inner portion of the outer walls of the matrix skirts being apertured to dissipate heat from the inner portions of the inner walls of the skirt whereby the heat is tapered to less than a vulcanizing temperature at the inner edges of the inner walls of the skirt, and means for clamping said matrix about a tire in said annular heating member.

13. In a tire retreader, a matrix comprising a body portion and thead-molding insert, means for heating the outer periphery only of the retreader, said body portion having skirts extending inwardly of the insert, said skirts being hollow and providing inner and outer walls, the outer edges of the inner walls being spaced from the outer walls and being in contact with the tread-molding insert for obtaining a vulcanizing heat therefrom, the outer wall of the skirts being apertured adjacent the inner periphery thereof whereby the heat in the inner walls of the skirts tapers from a vulcanizing temperature adjacent the tread-molding insert to a non-vulcanizing temperature at their inner edges.

14. In a tire retreader, a matrix comprising a body portion and a tread-molding insert, said body portion peripherally embracing said tread-molding insert, means for heating the outer periphery only of the retreader, said body portion having skirts extending inwardly of the insert, said skirts being hollow and providing inner and outer walls, the outer edges of the inner walls being spaced from the outer walls and being in contact with the tread-molding insert for obtaining a vulcanizing heat therefrom, the outer wall of the skirts being apertured adjacent the inner periphery thereof whereby the heat in the inner walls of the skirts tapers from a vulcanizing temperature adjacent the tread-molding insert to a non-vulcanizing temperature at their inner edges.

15. A full circle retreader comprising an annular heating member, a matrix adapted to fit therein, and means for clamping said matrix thereon, said matrix including a body portion of iron and a tread-molding insert of aluminum, said body portion being shaped peripherally to embrace the sides of said tread-molding insert, the central outer peripheral portion of the tread-molding insert and the outer periphery of the body portion contacting said heating member, the body portion having skirt extending inwardly of said tread-molding insert, said skirts being hollow and the outer walls thereof being apertured adjacent their inner peripheries, the outer edges of the inner walls of the skirts being spaced from the outer walls and being in contact with the tread-molding insert, whereby the heat delivered to the inner walls of the skirts tapers from a vulcanizing heat adjacent their outer edges to a non-vulcanizing heat adjacent their inner edges.

16. A full circle retreader comprising an annular heating member, a matrix adapted to fit therein, and means for clamping said matrix thereon, said matrix including a body portion and a tread-molding insert, said body portion being shaped peripherally to embrace the sides of said tread-molding insert, the central outer peripheral portion of the tread-molding insert and the outer periphery of the body portion contacting said heating member, the body portion having skirts extending inwardly of said tread-molding insert, said skirts being hollow and the outer walls thereof being apertured adjacent their inner peripheries, the outer edges of the inner walls of the skirts being spaced from the outer walls and being in contact with the tread-molding insert, whereby the heat delivered to the inner walls of the skirts tapers from a vulcanizing heat adjacent their outer edges to a non-vulcanizing heat adjacent their inner edges.

17. A full circle retreader comprising an annular heating member, a matrix adapted to fit therein, and means for clamping said matrix thereon, said matrix including a body portion and a tread-molding insert, said body portion being shaped peripherally to embrace the sides of said tread-molding insert, the central outer peripheral portion of the tread-molding insert and the outer periphery of the body portion contacting said heating member, the body portion having skirts extending inwardly of said tread-molding insert, said skirts being hollow and the outer walls thereof being apertured adjacent their inner peripheries, whereby the heat delivered to the inner walls of the skirts tapers from a vulcanizing heat adjacent their outer edges to a non-vulcanizing heat adjacent their inner edges.

18. A full circle retreader comprising an annular heating member, a matrix adapted to fit therein, and means for clamping said matrix thereon, said matrix including a body portion and a tread-molding insert, said body portion being shaped peripherally to embrace the sides of said tread-molding insert, the central outer peripheral portion of the tread-molding insert and the outer periphery of the body portion contacting said heating member, the body portion having skirts extending inwardly of said tread-molding insert, said skirts being hollow, the outer edges of the inner walls of the skirts being spaced from the outer walls and being in contact with the tread-molding insert, whereby the heat delivered to the inner walls of the skirts tapers from a vulcanizing heat adjacent their outer edges to a non-vulcanizing heat adjacent their inner edges.

LEO O. GRANGE.